United States Patent
Krach et al.

(10) Patent No.: US 8,471,764 B2
(45) Date of Patent: *Jun. 25, 2013

(54) METHOD FOR ESTIMATING HIDDEN CHANNEL PARAMETERS OF A GNSS NAVIGATION SIGNAL RECEIVED IN A MULTIPATH ENVIRONMENT

(75) Inventors: Bernhard Krach, Hilpolstein (DE); Michael Lentmaier, Dresden (DE); Patrick Robertson, Ammerland (DE)

(73) Assignee: Deutsches Zentrum für Luft- und Raumfahrt e.V., Köln (DE)

( * ) Notice: Subject to any disclaimer, the term of this patent is extended or adjusted under 35 U.S.C. 154(b) by 266 days.

This patent is subject to a terminal disclaimer.

(21) Appl. No.: 12/383,507

(22) Filed: Mar. 25, 2009

(65) Prior Publication Data
US 2009/0243927 A1    Oct. 1, 2009

(30) Foreign Application Priority Data
Mar. 27, 2008  (DE) .................. 10 2008 016 241

(51) Int. Cl.
*G01S 19/22* (2010.01)
*G01C 21/30* (2006.01)
*G01C 21/32* (2006.01)
*H04B 1/00* (2006.01)

(52) U.S. Cl.
USPC .. 342/357.61; 375/148; 701/208; 342/357.12

(58) Field of Classification Search
USPC .......... 342/357.12, 357.61; 375/148; 701/208
See application file for complete search history.

(56) References Cited

U.S. PATENT DOCUMENTS

| | | | |
|---|---|---|---|
| 5,963,167 A * | 10/1999 | Lichten et al. | 342/357.59 |
| 6,868,276 B2 * | 3/2005 | Nissila | 455/504 |
| 7,813,438 B2 * | 10/2010 | Farhang-Boroujeny et al. | 375/262 |
| 2002/0116154 A1 * | 8/2002 | Nowak et al. | 702/186 |
| 2004/0081074 A1 * | 4/2004 | Piechocki | 370/206 |
| 2006/0023636 A1 * | 2/2006 | Farhang-Boroujeny et al. | 370/252 |
| 2006/0183430 A1 | 8/2006 | Godsill et al. | |

OTHER PUBLICATIONS

Arulampalam et al., "A Tutorial on Particle Filters for Online Nonlinear/Non-Gaussian Bayesian Tracking", IEEE Transactions on Signal Processing, vol. 50, No. 2, Feb. 2002.*

Closas et al., "A Bayesian Approach to Multipath Mitigation in GNSS Receivers", IEEE Journal of Selected Topics in Signal Processing, vol. 4, pp. 695-706, 2009.*

(Continued)

*Primary Examiner* — Jack W Keith
*Assistant Examiner* — Frank J McGue
(74) *Attorney, Agent, or Firm* — Collard & Roe, P.C.

(57) ABSTRACT

A method for estimating hidden channel parameters of a GNSS navigation signal received in a multipath environment includes a sequential Bayesian estimation. A movement model forms the basis of the estimation and is designed especially for dynamic channel scenarios and takes into account the speeds of change and the variable life cycles of the path. The estimator is implemented as a recursive Bayesian filter for a combined determination of positions and suppression of multipaths. The binding of the delay of the direct path is taken into consideration via position and clock parameters. The method is carried out with GNSS satellite navigation receivers, e.g. GPS and Galileo. With the method, multipath error of received GNSS navigation signals is reduced. The multipath channel includes a direct path and Nm-I echo signals and each of these paths may be considered on or off for the estimation.

2 Claims, 7 Drawing Sheets

OTHER PUBLICATIONS

Lentmaier et al., "Bayesian Time Delay Estimation of GNSS Signals in Dynamic Multipath Environments", International Journal of Navigation and Observation, Mar. 17, 2008.*
A. van Dierendonck, P. Fenton, T. Ford: "Theory and Performance of Narrow Correlator Spacing in a GPS Receiver" in Proceedings of the ION National Technical Meeting 1992, San Diego, California, USA, 1992, vol. 39, No. 3, pp. 265-283.
L. Garin, F. van Diggelen, J. Rousseau: "Strobe and Edge Correlator Multipath Mitigation for Code" in Proceedings of the ION GPS 1996, Kansas City, Missouri, USA, 1996, pp. 657-664.
G. MacGraw, M. Brasch: "GNSS Multipath Mitigation using Gated and High Resolution Correlator Concepts" in Proceedings of the ION National Technical Meeting 1999, San Diego, California, USA, 1999, pp. 333-342.
J. Jones, P. Fenton, B. Smith: "Theory and Performance of the Pulse Aperture Correlator" in NovAtel Technical Report, NovAtel Inc., Calgary, Alberta, Canada, 2004, pp. 1-13.
D. van Nee, J. Siereveld, P. Fenton, and B. Townsend: "The Multipath Estimating Delay Lock Loop: Approaching Theoretical Accuracy Limits" in Proceedings of the IEEE Position, Location and Navigation Symposium 1994, Las Vegas, Nevada, USA, 1994, pp. 1-6.
L. Weill: "Achieving Theoretical Accuracy Limits for Pseudoranging in the Presence of Multipath" in Proceedings of the ION GPS 1995, Palm Springs, California, USA, 1995, pp. 1521-1530.
J. Selva: "Complexity Reduction in the Parametric Estimation of Superimposed Signal Replicas" in Signal Processing, Elsevier Science, vol. 84, No. 12, 2004, pp. 2325-2343.
P. Fenton, J. Jones: "The Theory and Performance of Novatel Inc's Vision Correlator" in Proceedings of the ION GNSS 2005, Long Beach, California, USA, Sep. 2005, pp. 1-9.
P. Closas, C. Fernandez-Prades, J. Fernandez-Rubio, A. Ramirez-Gonzalez: "Multipath Mitigation using Particle Filtering" in Proceedings of the ION GNSS 2006, Fort Worth, Texas, USA, Sep. 2006, pp. 1-8.
A. Giremus and J.-Y. Tourneret: "Joint detection/estimation of multipath effects for the global positioning system", Proceedings of the IEEE International Conference on Acoustics, Speech and Signal Processing, 2005, vol. 4, Philadelphia, Pennsylvania, USA, Mar. 2005, pp. 17-20.
P. Closas, C. Fernandez-Prades, and J. Fernandez-Rubio: "Maximum likelihood estimation of position in GNSS", IEEE Signal Processing Letters, vol. 14, No. 5, May 2007, pp. 1-4.
Garin et al., "Enhanced Strobe Correlator Multipath Rejection for Code & Carrier,"Ashtech, Inc., Sunnyvale, CA, ION-GPS, 1997, Session B2-Multipath, paper #4, pp. 559-568.
J. Selva Vera, PH.D. dissertation "Efficient Multipath Mitigation in Navigation Systems," Universidad Politècnica de Catalunya, Feb. 2004, pp. 1-158.
B. Krach, M. Lentmaier: "Efficient Soft-Output GNSS Signal Parameter Estimation using Signal Compression Techniques" in Proceedings of the 3rd ESA Workshop on Satellite Navigation User Equipment Technologies, Navitec 2006, Noordwijk, The Netherlands, Dec. 2006, pp. 1-8. (German OA).
Teunissen, P.J.G., "Statistical GNSS Carrier Phase Ambiguity Resolution: A Review," Statistical Processing, 2001. Proceedings of the $11_{th}$ IEEE Signal Processing Workshop, pp. 4-12. (German OA).
Ober, P. B., "Integrity According to Bayes," Position Location and Navigation Symposium, IEEE, 2000, pp. 325-332. (German OA).
M. Angermann, J. Kammann, P. Robertson, A. Steingass and T. Strang: "*Software Representation for Heterogeneous Location Data Sources Using Probability Density Functions*", International Symposium on Location Based Services for Cellular Users, LOCELLUS 2001, Munich, Germany, Feb. 2001, pp. 107-118.
Kris Huber and Simon Haykin "Improved Bayesian MIMO Channel Tracking for Wireless Communications:Incorporating a Dynamical Model", IEEE Transactions on Wireless Communications, vol. 5, No. 9, Sep. 2006.
Hai Huang, Changchuan Yin, and Guangxin Yue, "Symbol Timing Estimation for OFDM Systems Using Particle Filtering", School of Telecommunications Engineering, Beijing University of Posts and Telecommunications, IEEE, Apr. 2007.

* cited by examiner

METHOD FOR ESTIMATING HIDDEN CHANNEL PARAMETERS OF A GNSS NAVIGATION SIGNAL RECEIVED IN A MULTIPATH ENVIRONMENT

CROSS REFERENCE TO RELATED APPLICATIONS

Applicants claim priority under 35 U.S.C. §119 of German Application No. 10 2008 016 241.8 filed on Mar. 27, 2008.

BACKGROUND OF THE INVENTION

1. Field of the Invention

The invention refers to a method for estimating hidden channel parameters, specifically the delay, the amplitude and the phase, of a GNSS navigation signal received in a dynamic multipath environment, using a sequential estimation by means of a recursive Bayesian filtering which starts from the likelihood value of the measured channel output signal and updates the value using a state transition model, wherein previous knowledge about the statistic dependences of subsequent sets of time-varying channel parameters is utilized by introducing a movement model approximated to the actual channel environment, which model corresponds to a Markov process and forms the state transition model, the knowledge that reflection signals typically have a life cycle starting from their first appearance and experiencing a gradual change in delay, amplitude and phase over time until they disappear, being utilized for an a-posteriori prediction, and, with this movement model as the basis, the channel parameters are estimated sequentially by means of the recursive Bayesian filter, the number of paths being implicitly included in the estimation, and the result of this estimation is not only a fixed estimated value, but yields a-posteriori probability density functions of the estimated channel parameters.

2. Description of Related Art

Measuring the propagation time of signals emitted from sources of known position to a receiver allows to determine the position of the receiver in three-dimensional space. As a precondition, the receiver in a synchronous system (synchronous receivers and sources) must be able to receive the signals from at least three sources. If the receiver clock is not synchronous with the clocks of the sources, the propagation time measurement, and thus the determination of position, requires signals from four sources, since the clock error of the receiver must be calculated in addition to the coordinates. This method of determining a position is referred to as "Time of Arrival" (TOA) or as "pseudo-ranging" and is employed in satellite navigation methods, for example.

Figure 1:
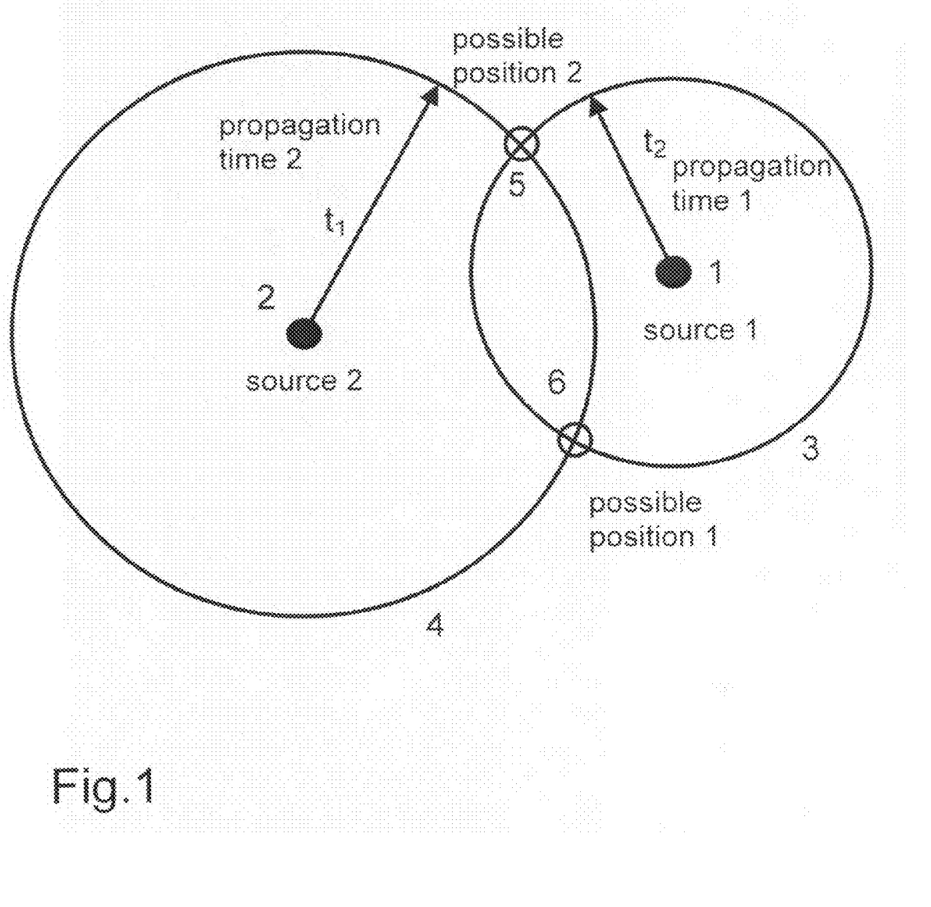
FIG. 1 is a general illustration of the known and above explained principle of the determination of positions by means of TOA (Time Of Arrival) for a two-dimensional problem.

With a two-dimensional problem, for example, the propagation time estimates form circles around the respective sources, the points of intersection of the circles representing the possible positions of the receivers. In this context, reference is made to FIG. 1, in which the sources 1 and 2, emitting radio waves, are provided and the circles around the two sources 1 and 2 are identified as 3 and 4. Up to the circle 3, the estimated propagation time is $t_1$, and to the circle 4, the estimated propagation time is $t_2$. one of the two points of intersection 5 and 6 between the two circles 3 and 4 can often be excluded on the basis of previous knowledge so that an unambiguous solution is obtained.

Analogously, in a three-dimensional case, the points of intersection are located on spheres whose centres form the sources.

Problematic for the TOA method are the errors in the respective propagation time estimates that take effect as errors in the estimation of position.

By measuring the individual signal propagation times $\tau_{1,j,k}$ and by using the known positions of the sources $[p_{j,k}^{t,x}\ p_{j,k}^{t,y}\ p_{j,k}^{t,z}]$ at the time k, the geometry for $j=1, \ldots, M$ sources yields the following non-linear equation system for the vector of the relevant receiver parameters $p = [p_k^{r,x}\ p_k^{r,y}\ p_k^{r,z}\ \tau_k^r]^T$, where, $p_k^{r,x}, p_k^{r,y}, p_k^{r,z}$ are the receiver coordinates and $\tau_k^r$ is the clock error of the receiver.

$$c^{-1}\sqrt{\begin{aligned}(p_k^{r,x} - p_{1,k}^{t,x})^2 + \\ (p_k^{r,y} - p_{1,k}^{t,y})^2 + \\ (p_k^{r,z} - p_{1,k}^{t,z})^2\end{aligned}} + \tau_k^r - \varepsilon_{1,k} = \tau_{1,1,k}$$

$$\vdots$$

$$c^{-1}\sqrt{\begin{aligned}(p_k^{r,x} - p_{j,k}^{t,x})^2 + \\ (p_k^{r,y} - p_{j,k}^{t,y})^2 + \\ (p_k^{r,z} - p_{j,k}^{t,z})^2\end{aligned}} + \tau_k^r - \varepsilon_{j,k} = \tau_{1,j,k}$$

$$\vdots$$

$$c^{-1}\sqrt{\begin{aligned}(p_k^{r,x} - p_{M,k}^{t,x})^2 + \\ (p_k^{r,y} - p_{M,k}^{t,y})^2 + \\ (p_k^{r,z} - p_{M,k}^{t,z})^2\end{aligned}} + \tau_k^r - \varepsilon_{M,k} = \tau_{1,M,k}$$

Here, c is the speed of the signal (speed of light) and the values of $\varepsilon_{j,k}$ are correction terms assumed to be known (e.g. terms for the correction of ionosphere, troposphere and clocks). Since the system of equations is non-linear, the same is generally linearized and solved iteratively. If, summarizing, $$H_j(p) = c^{-1}\sqrt{(p_k^{r,x} - p_{j,k}^{t,x})^2 + (p_k^{r,y} - p_{j,k}^{t,y})^2 + (p_k^{r,z} - p_{j,k}^{t,z})^2} + \tau_k^r - \varepsilon_{j,k} = \tau_{1,j,k},$$

then the following linearized system of equation is obtained $$\underbrace{\begin{pmatrix} \frac{dH_1(p)}{dp_k^{r,x}}\Big|_{p=p_0} & \frac{dH_1(p)}{dp_k^{r,y}}\Big|_{p=p_0} & \frac{dH_1(p)}{dp_k^{r,z}}\Big|_{p=p_0} & \frac{dH_1(p)}{d\tau_k^r}\Big|_{p=p_0} \\ \vdots & \vdots & \vdots & \vdots \\ \frac{dH_j(p)}{dp_k^{r,x}}\Big|_{p=p_0} & \frac{dH_j(p)}{dp_k^{r,y}}\Big|_{p=p_0} & \frac{dH_j(p)}{dp_k^{r,z}}\Big|_{p=p_0} & \frac{dH_j(p)}{d\tau_k^r}\Big|_{p=p_0} \\ \vdots & \vdots & \vdots & \vdots \\ \frac{dH_M(p)}{dp_k^{r,x}}\Big|_{p=p_0} & \frac{dH_M(p)}{dp_k^{r,y}}\Big|_{p=p_0} & \frac{dH_M(p)}{dp_k^{r,z}}\Big|_{p=p_0} & \frac{dH_M(p)}{d\tau_k^r}\Big|_{p=p_0} \end{pmatrix}}_{H(p_0)}$$

$$\underbrace{\begin{pmatrix} \Delta p_k^{r,x} \\ \Delta p_k^{r,y} \\ \Delta p_k^{r,z} \\ \Delta \tau_k^r \end{pmatrix}}_{\Delta p} = \underbrace{\begin{pmatrix} \tau_{1,1,k} + \varepsilon_{1,k} - H_1(p_0) \\ \vdots \\ \tau_{1,j,k} + \varepsilon_{j,k} - H_j(p_0) \\ \vdots \\ \tau_{1,M,k} + \varepsilon_{M,k} - H_M(p_0) \end{pmatrix}}_{d}$$

If the individual propagation time estimates have different variances, the individual propagation time estimates may be weighted differently according to their variance when the position solution is calculated. This is achieved with the help of the following weighting matrix of a diagonal structure:

$$W = \begin{pmatrix} \sigma_1^{-2} & 0 & \cdots & \cdots & 0 \\ 0 & \ddots & \ddots & & \vdots \\ \vdots & \ddots & \sigma_i^{-2} & \ddots & \vdots \\ \vdots & & \ddots & \ddots & 0 \\ 0 & \cdots & \cdots & 0 & \sigma_N^{-2} \end{pmatrix}$$

The iterative solution is then obtained in the following manner:

```
defining p_0 (according to previous knowledge)
for i = 1:N_iterations
    Δp = [H^T(p_0)WH(p_0)]^-1 H^T(p_0)Wd
    p_0 = p_0 + Δp
end
    p = p_0.
```

In this case, the convergence of the solution is generally achieved already after a few iterations. For an overdetermined system of equations with more than four sources, the solution obtained is the so-called "mean least squares" solution that minimizes the mean square error.

Figure 2:
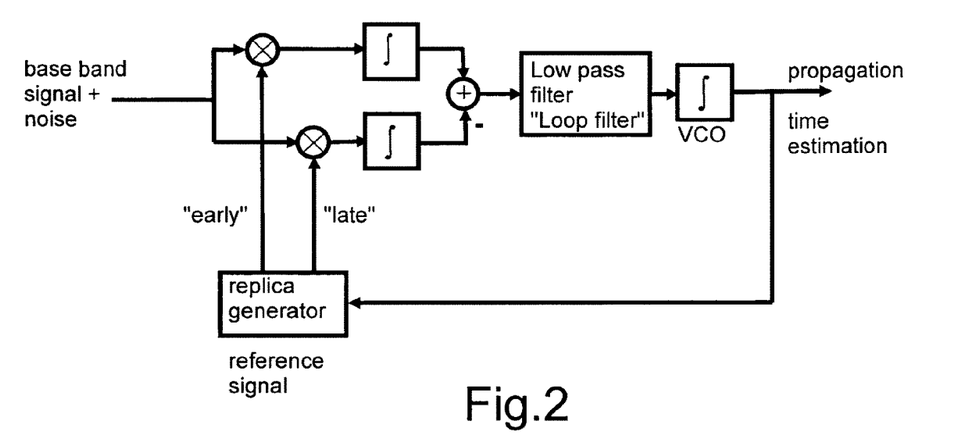
FIG. 2 is a block diagram of the known and also above explained principle of a standard Delay Lock Loop (DLL) for use in a navigation receiver.

For a continuous estimation of the propagation time of incoming signals, which are variable in time due to the movement of a satellite and a receiver, a navigation receiver usually uses a combination of two control loops supporting each other. The so-called phase-lock-loop (PLL) for the control of the carrier phase is used to guarantee coherence with the received signal and to allow for a representation in the baseband. The so-called delay-lock-loop (DLL), illustrated in FIG. 2, synchronizes the received baseband signal with a locally simulated reference signal, formed in a replica generator, by maximizing their cross-correlation. A constant tracking of the maximum for the maintenance of the synchronization is achieved by corresponding shiftings ("early", "late") of the reference signal from which the propagation time of the signal from the satellite to the receiver can be determined.

Figure 3:
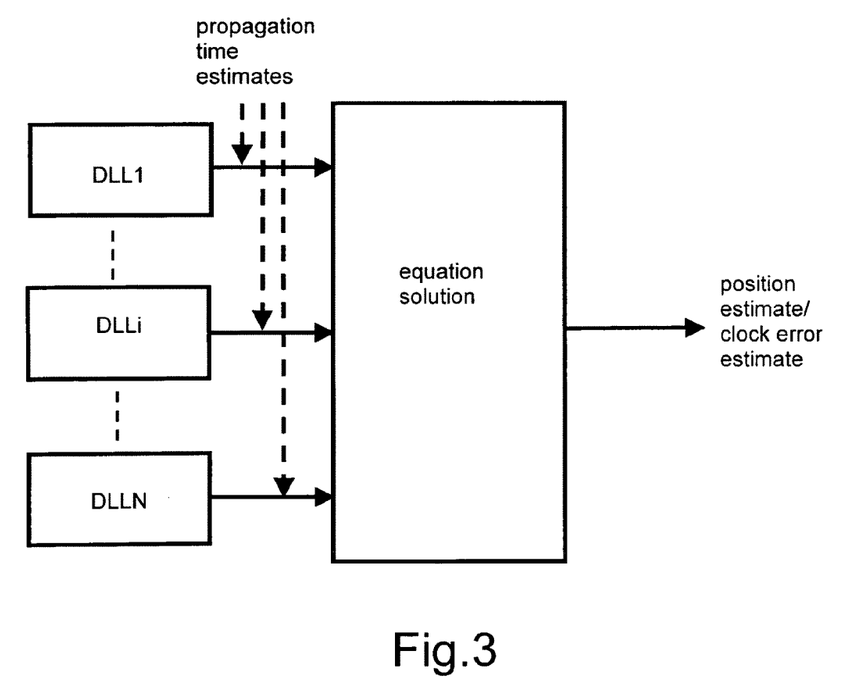
FIG. 3 is a block diagram of the known and also above explained principle of the standard determination of positions in a navigation receiver comprising a plurality of DLLs.

The receiver will then determine its own position from the propagation times of at least four satellites. Reference is made in this context to FIG. 3, where a plurality of Delay Lock Loops DLL 1, . . . , DLL i, . . . , DLL N is used to estimate propagation time. From the propagation time estimates, an estimation of the position and of the clock error is obtained by solving corresponding equations.

In practice, this combination of DLL and PLL proves to be a robust realization of an almost optimal propagation time estimation device when there is no multipath propagation of the signals. If, however, the received signal is formed by a superposition of individual paths, which mainly occurs due to the transmitted signal being reflected or diffracted from objects in the vicinity of the receiver, the DLL will provide an erroneous estimation, which has an immediate effect on the precision of the position result.

Of the known signal processing methods for reducing the multipath error, most are based on more or less immediate modifications of the conventional DLL, aiming at reducing the influence of the additional paths as much as possible, i.e. to suppress this influence, as it were.

Besides the presumably most simple variant, the so-called "narrow correlator" [A. van Dierendonck, P. Fenton, T. Ford: "Theory and Performance of Narrow Correlator Spacing in a GPS Receiver" in Proceedings of the ION National Technical Meeting 1992, San Diego, Calif., USA, 1992], wide-spread use is also made, for example, of the so-called "strobe correlator" [L. Garin, F. van Diggelen, J. Rousseau: "Strobe and Edge Correlator Multipath Mitigation for Code" in Proceedings of the ION GPS 1996, Kansas City, Mo., USA, 1996], the so-called "gated correlator" [G. MacGraw, M. Brasch: "GNSS Multipath Mitigation using Gated and High Resolution Correlator Concepts" in Proceedings of the ION National Technical Meeting 1999, San Diego, Calif., USA, 1999] and the so-called "pulse-aperture correlator" [J. Jones, P. Fenton, B. Smith: "Theory and Performance of the Pulse Aperture Correlator" in NovAtel Technical Report, NovAtel Inc., Calgary, Alberta, Canada, 2004].

Another approach to the reduction of multipath errors is to include the additional paths in the formulation of the estimation problem and to solve the same by optimum methods or simplifications of such methods. These include the various variants of maximum likelihood (ML) estimation methods. Examples thereof are known from:

D. van Nee, J. Siereveld, P. Fenton, and B. Townsend: "The Multipath Estimating Delay Lock Loop: Approaching Theoretical Accuracy Limits" in Proceedings of the IEEE Position, Location and Navigation Symposium 1994, Las Vegas, Nev., USA, 1994;

L. Weill: "Achieving Theoretical Accuracy Limits for Pseudo-ranging in the Presence of Multipath" in Proceedings of the ION GPS 1995, Palm Springs, Calif., USA, 1995;

J. Selva Vera: "Complexity Reduction in the Parametric Estimation of Superimposed Signal Replicas" in Signal Processing, Elsevier Science, vol. 84, no. 12, pages 2325-2343, 2004; and P. Fenton, J. Jones: "The Theory and Performance of Novatel Inc's Vision Correlator" in Proceedings of the ION GNSS 2005, Long Beach, Calif., USA, September. 2005.

While all these known estimation methods are based on the same concept, they differ in the details of the manner in which they strive to realize the solution as effectively as possible. In effect, an immediate implementation will fail due to the unrealistically high complexity. With static channels, the ML estimator is optimal and obtains clearly better results than other methods, especially when the additional paths only show slight relative delays.

An estimator for multipath situations that is based on sequential importance sampling (SIS) methods (particle filtering) and is considered in an article by P. Closas, C. Fernandez-Prades, J. Fernandez-Rubio, A. Ramirez-Gonzalez: "Multipath Mitigation using Particle Filtering" in Proceedings of the ION GNSS 2006, Fort Worth, Tex., USA, September 2006, is advantageous in that it allows the additional use of a-priori knowledge about the channel properties. Further, the instantaneous solution and its covariance matrix are used to estimate the subsequent point in time, whereby the time-related correlation of the estimation parameters is taken into account.

One possible way to combine the knowledge about the temporal correlation of the estimation parameters with the methods for an efficient implementation of an ML estimator, proposed in the above mentioned article by J. Selva Vera, is presented in an article by B. Krach, M. Lentmaier: "Efficient Soft-Output GNSS Signal Parameter Estimation using Signal Compression Techniques" in Proceedings of the 3rd ESA Workshop on Satellite Navigation User Equipment Technologies, Navitec 2006, Noordwijk, The Netherlands, December 2006.

The knowledge about the parameter development may be provided, for example, by the DLL/PLL loop of a conventional receiver. The method allows to calculate the a-posteriori distribution of the estimation parameters whose maximum can be determined, for example, with the methods stated in the above mentioned article by J. Selva Vera.

Further approaches known from A. Giremus and Y.-Y. Tourneret: "Joint detection/estimation of multipath effects for the global positioning system", Proceedings of the IEEE International Conference on Acoustics, Speech and Signal Processing, 2005, vol. 4, Philadelphia, Pa., USA, March 2005, pages 14-20, and P. Closas, C. Fernandez-Prades, and J. Fernandez-Rubio: "Maximum likelihood estimation of position in GNSS", IEEE Signal Processing Letters, vol. 14, no. 5, pages 359-362, May 2007, use the binding of the different propagation time measurements via the position parameters to suppress or detect the multipath errors.

All presently existing methods are suboptimal and/or not adapted to the dynamic properties of the channels. In environments that are critical with respect to multipath propagation, such as in urban canyons in cities, the navigation receivers currently known do not work reliably.

When implementing a maximum likelihood (ML) estimation method, the number of paths is presumed to be known. In practice, this number has to be estimated or assumed, however, whereby the performance of these methods can be much impaired by erroneous assumptions or erroneous estimations of this parameter.

SUMMARY OF THE INVENTION

It is an object of the present invention to provide an advantageous solution with reduced complexity, with which multipath errors can be eliminated in an optimal manner in GNSS navigation receivers not only in static channel situations, but also in dynamic channel situations, whereby the reliability of such receivers is significantly increased, while the susceptibility to failure due to multipath reception is reduced and, above all, the determination of geographic positions is effected much more precisely.

According to the invention, which refers to a method of the type mentioned initially, this object is solved in the approximated movement model by taking into account the binding of the delay of the direct signal path via position and clock parameters determined on the receiver side.

A description as a sequential Bayesian estimation problem allows to formulate an optimum solution approach for dynamic multipath channels. For the important practical case of dynamic channel situations, the present invention provides a solution to the important practical case of dynamic channel scenarios, i.e. how to improve the estimation of propagation times when information about the chronological development of the channel parameters are available. The solution provided by the invention is based on Bayesian filtering, the optimal and known frame for solving such problems of dynamic state estimation.

An efficient and advantageous implementation is possible with the use of "sequential importance sampling" (SIS) methods ("particle filter").

Possible applications for the method operating according to the present invention, primarily exist in modern satellite navigation receivers, especially such receivers that are to allow navigation in difficult environments with strong, time-varying multipath propagation.

Furthermore, providing reliability information in the form of a-posteriori probabilities is of interest in certain so-called safety of life (SOL) applications.

BRIEF DESCRIPTION OF THE DRAWINGS

The following is a detailed description of the invention with reference to the accompanying drawings. In the Figures.

DETAILED DESCRIPTION OF PREFERRED EMBODIMENTS

First, the underlying signal model will be explained.

Let it be assumed that the complex-valued, baseband-equivalent received signal equals $$z(t) = \sum_{i=1}^{N_m} e_i(t) \cdot a_i(t) \cdot c(t) * g(t - \tau_i(t) + n(t)) \quad (1)$$

where c(t) is a delta-train code sequence modulated to a pulse g(t). $N_m$ is the total number of paths allowed that reach the receiver (so as to restrict the modeling complexity), $e_i(t)$ is a binary function controlling the activity of the i-th path and $a_i(t)$ as well as $\tau_i(t)$ are their individual complex amplitudes or time delays, respectively. Additional white Gaussian noise n(t) interferes with the signal.

If blocks of L samplings at the times (m+kL) $T_s$, m=0, ..., L−1 are grouped as vectors $z_k$, k=0, ..., wherein the parameter functions $e_i(t)$, $a_i(t)$ and $z_i(t)$ are assumed to be constant within the corresponding period and equal to $e_{i,k}(t)$, $a_{i,k}(t)$ and $\tau_{i,k}(t)$, this can be rewritten as $$z_k = \underbrace{CG(\tau_k)E_k a_k}_{s_k} + n_k \quad (2)$$

In the compact form of the right side of equation (2), the samplings of the delayed pulses $g(\tau_{i,k})$ are stacked as columns of the matrix $G(\tau_k) = [g(\tau_{i,k}), \ldots, g(\tau_{N_m,k})]$, where C is a matrix representing the convolution with the code and the propagation times and amplitudes are comprised in the vectors $\tau_k = [\tau_{1,k}, \ldots, \tau_{N_m,k}]$ and $a_k = [a_{1,k}, \ldots, a_{N_m,k}]$. Moreover, $E_k = \text{diag}[e_k]$ is used in short notation, where the elements of the vector $e_k = [e_{1,k}, \ldots, e_{N_m,k}]^T$, $e_{i,k} \in 0,1$ determine whether the i-th path is active or not, by either $e_{i,k}=1$, corresponding to an active path, or $e_{i,k}=0$, corresponding to a path not active at the moment. The term $s_k$ refers to the signal hypothesis and is entirely determined by the channel parameters $\tau_k$, $a_k$ and $e_k$. Using equation (2), the associated likelihood function can be written as:

$$p(z_k | s_k) = \frac{1}{(2\pi)^L \sigma^{2L}} \cdot \exp\left[-\frac{1}{2\sigma^2}(z_k - s_k)^H(z_k - s_k)\right] \quad (3)$$

The likelihood function is of central importance for the algorithms discussed herein; its purpose is the quantification of the conditional probability of the received signal determined by the unknown signal, specifically the channel parameters.

A reduction of the complexity can be obtained by data compression, interpolation and elimination of amplitudes.

In the PH.D. dissertation "Efficient Multipath Mitigation in Navigation Systems" by J. Selva Vera, Universidad Politècnica de Catalunya, February 2004, a general concept for an efficient representation of the likelihood of equation (3) was presented that is applicable to may existing ML multipath error reduction methods. The basic idea of this concept is to formulate the equation (3) by a vector $z_{c,k}$ that results from an orthogonal projection of the observed signal $z_k$ to a smaller vector space, so that $z_{c,k}$ is a sufficient statistic value according to the Neymann-Fisher factorization and is thus suitable for estimating $s_k$.

In other words: the reduced signal includes the same information as the original signal itself. In practice, this concept becomes relevant, since the projection can be achieved by processing the received signal of equation (2) by means of a correlator bank and a subsequent decorrelation of the correlator output signals. A variant of this very general concept has also been referred to as a signal compression theorem for a set of special projections, which, due to the structure of the correlators used, do not require the decorrelation step.

Different from the correlation technique used in the above mentioned article by D. van Nee, J. Siereveld, P. Fenton, B. Townsend, the technique proposed in the article by P. Fenton, J. Jones, also mentioned before, for example already projects to an orthogonal and thus uncorrelated sub-space, similar to the code-adjusted correlator technique proposed in the above mentioned dissertation document. For reasons of complexity, all practically relevant embodiments of ML estimators operate in a projected space, namely after correlation. The corresponding mathematical background will be discussed farther below, including the interpolation of the likelihood and the elimination of complex amplitudes as further methods for a reduction of complexity.

First, data compression for the reduction of complexity will be discussed. As explained above, the large vector, which includes the samplings $z_k$ of the received signal, is linearly transformed to a vector $z_{c,k}$ of much smaller size. Following this solution, the likelihood of equation (2) may be written in another form as $$p(z_k | s_k) = \frac{1}{(2\pi)^L \sigma^{2L}} \exp\left[-\frac{z_k^H z_k}{2\sigma^2}\right]. \quad (4)$$

$$\exp\left[\frac{\Re\{z_k^H Q_c Q_c^H s_k\}}{\sigma^2} - \frac{s_k^H Q_c Q_c^H s_k}{2\sigma^2}\right]$$

$$= \frac{1}{(2\pi)^L \sigma^{2L}} \exp\left[-\frac{z_k^H z_k}{2\sigma^2}\right].$$

$$\exp\left[\frac{\Re\{z_{c,k}^H s_{c,k}\}}{\sigma^2} - \frac{s_{c,k}^H s_{c,k}}{2\sigma^2}\right]$$

with the compressed reception vector $z_{c,k}$ and the compressed signal hypothesis $s_{c,k}$:

$$z_{c,k} = Q_c^H z_k, s_{c,k} = Q_c^H s_k \quad (5)$$

and the orthonormal compression matrix $Q_c$ that has to fulfill $$Q_c Q_c^H \approx I, Q_c^H Q_c \approx I \quad (6)$$

in order to minimize the compression loss. According to the above mentioned dissertation document, the compression may be double, so that $$Q_c = Q_{cc} Q_{pc} \quad (7)$$

can be factorized to a canonic component decomposition $Q_{cc}$ and a principal component decomposition $Q_{pc}$. In the above mentioned dissertation document, two possible choices are proposed for $Q_{cc}$, namely $$Q_{cc} = \begin{cases} CG(\tau^b) R_{cc}^{-1} & \text{signal-adjusted} \\ C(\tau^b) R_{cc}^{-1} & \text{code-adjusted} \end{cases} \quad (8)$$

where the elements of the vector $\tau^b$ define the positions of the individual correlations. For a decorrelation of the correlator output signals, as mentioned above, the whitening matrix $R_{cc}$ may be obtained from a QR decomposition of $CG(\tau^b)$ or $C(\tau^b)$. Apart from operational conditions, both correlation methods indicated by equation (8) are equivalent from a conceptual point of view. As far as details regarding the compression by $Q_{pc}$, reference is made to the above mentioned dissertation document.

Hereinafter, the interpolation performed in connection with the reduction of the complexity will be discussed. In order to calculate equation (4) irrespective of the sampling grid, interpolation methods may be employed to an advantage. When using the discrete Fourier transformation (DFT), where $\psi$ is the DFT matrix and $\psi^{-1}$ is its inverted counterpart (IDFT), $$s_{c,k} = \underbrace{Q_c^H C \psi^{-1} \text{diag}[\psi g(0)] \Omega(\tau_k) E_k a_k}_{M_{s_c} = \text{const.}} \quad (9)$$

will be obtained, where $\Omega(\tau_k)$ being a matrix of stacked vectors of a Vandermonde structure.

Finally, in the context of the reduction of complexity, amplitude elimination shall also be discussed herein. In a further step, the number of parameters is reduced by optimizing the equation (4) for a given set of $\tau_k$ and $e_k$ with respect to the complex amplitudes $a_k$, which may be achieved through a solution of a closed form. By using $$S_{c,k} = M_{S_c} \Omega(\tau_k) E_k \qquad (10)$$

and obtaining $S_{c,k}^+$ by removing the zero columns from $S_{c,k}$, the corresponding amplitude values of the active paths are obtained:

$$\hat{a}_k^+ = (S_{c,k}^{+H} S_{c,k}^+)^{-1} S_{c,k}^{+H} \bar{z}_{c,k} \qquad (11)$$

Since a potential source of loss in performance has been introduced by the elimination of the amplitudes and their correlation in time is thus practically not considered, it is proposed to optimize equation (4) by using $$\bar{z}_{c,k} = \frac{1}{Q} \cdot \sum_{i=0}^{Q-1} z_{c,k-1} \qquad (12)$$

with the adjustable observation coefficient Q. When equation (4) is evaluated, $$s_{c,k} = S_{c,k} \hat{a}_k \qquad (13)$$

is used, where the elements of the vector $\hat{a}_k$ that indicate an active path ($a_{k,i}$: $i \rightarrow e_{k,i}=1$) are set to the corresponding elements of $\hat{a}_k^+$. All other elements ($a_{k,i}$: $i \rightarrow e_{k,i}=0$) may be set optionally, since their influence is masked by the zero elements of $e_k$.

The maximum likelihood (ML) concept will be discussed hereinafter in the context of the underlying signal model.

The concept of ML multipath estimation has given rise to substantial research interest ever since the first solution has been proposed in the above mentioned article by D. van Nee, J. Siereveld, P. Fenton, B. Townsend. Despite different approaches in different publications, the goal is the same for all ML solutions, namely to find the signal parameters that maximize equation (3) for a given observation $z_k$:

$$\hat{s}_k = \underset{s_k}{\mathrm{argmax}}\{p(z_k | s_k)\} \qquad (14)$$

Therefore, the signal parameters are assumed to be constant over the observation period k. There are different maximizing strategies that characterize the different solutions principally. Although substantial advantages in the theoretical analysis are offered, the practical advantage of the actual ML concept is doubtable due to a number of serious drawbacks:

The ML estimator requires the channel to be static for the observation period, and it is not capable of making use of its correlation in time over the sequence k=1, . . . . Measured channel situations have shown a significant correlation in time.

Although of great interest in practice, the estimation of the number of reception channels often is not addressed. The decisive problem in this respect is to estimate the current number of paths correctly, so as to avoid a redundant determination, since a redundantly determined estimator tends to use the additional degrees of freedom for an adjustment of noise by introducing wrong paths. Various complex heuristics based on a selection of models are used to estimate the number of paths, by they suffer from the problem that the decision thresholds have to be adjusted dynamically. Typically, only a single hypothesis is followed which, in practice, causes the propagation of an error event.

The ML estimator only provides the most probable set of parameters for the given observation. No reliability information about the estimated values is included. As a consequence, ambiguities and multimodes of the likelihood are not preserved by the estimator.

In practice, the following has to be taken into account during an ML execution. ML estimators require the parameters estimated to remain constant during the observation period. Due to data modulation and phase changes, this period, often referred to as the coherent integration time, is limited in practice to a span from 1 ms to 20 ms.

In order to obtain a sufficient noise performance with an ML estimator in practice, it is necessary to expand its observation interval to about the equivalent adjustment time of a conventional tracing loop that usually is on the order of several hundred coherent integration periods. To eliminate these problems, the observations must become quasi coherent by supporting the ML estimator with a phase lock loop (PLL) and a data removal mechanism.

Figure 4:
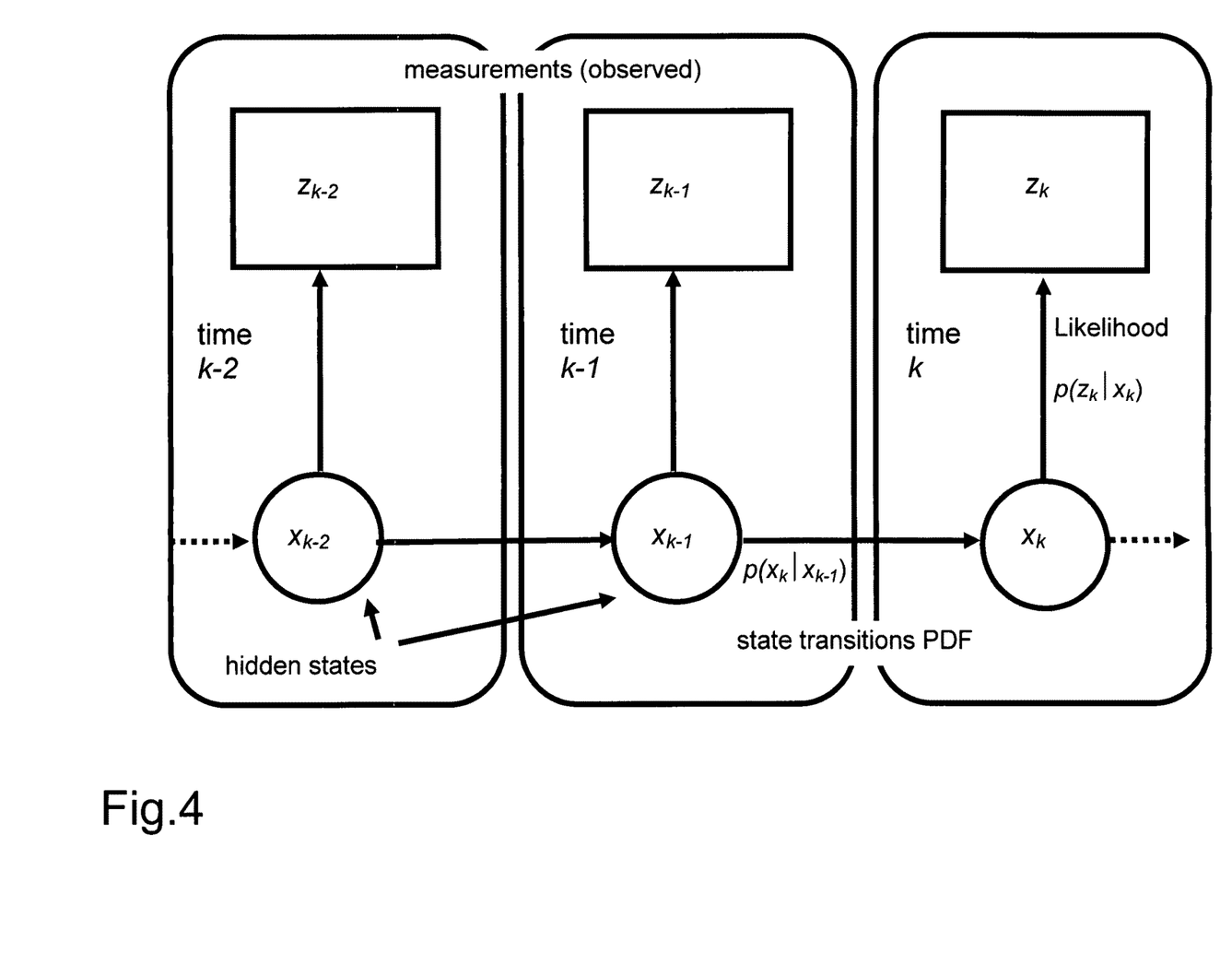
FIG. 4 is a block diagram of the hidden Markov estimation process for three times, the channel measurements being represented by the sequence $z_i$, i=1, ..., k, and the channel parameters are $x_i$, i=1, ..., k.
Figure 5:
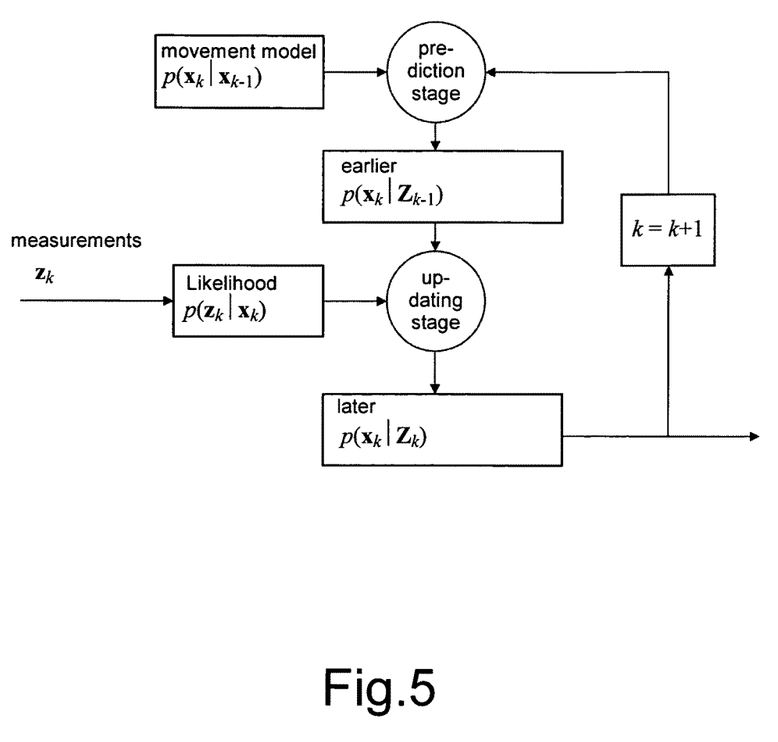
FIG. 5 illustrates, again as a block diagram, a recursive Bayesian estimation filter.

The following is an explanation of the sequential estimation used in the method of the present invention with reference to FIG. 4 and FIG. 5.

First, the optimum solution will be discussed.

In the preceding part of the description, the signal models of the underlying time-varying processes have been established. The problem of multipath error reduction now becomes a problem of a sequential estimation of a hidden Markov process: The unknown channel parameters are to be estimated on the basis of a building sequence of received noisy channel output signals $z_k$.

The channel process for each coverage range of a satellite navigation system may be modeled as a Markov process of the first order, if future channel parameters—in the known present state and all of its past states—only depend on the present state of the channel (and not on any past states). It is further assumed that the noise influencing the sequential channel output signals is independent of the past noise values. Thus, each channel observation only depends on the present channel state. As is known, Markov processes of higher order can be transformed into such processes of the first order.

By intuition, not only the channel observation is used, to estimate the hidden channel parameters (through the likelihood function), but previous knowledge about the statistical dependencies between subsequent sets of channel parameters are used as well. It is known from channel measurements that channel parameters are time-varying, but not independently from one point in time to the next; usually an echo signal has a "life cycle" from its first appearance, followed by a more or less gradual change in its delay and phase over time, until it disappears.

After the principal assumptions have been made, the concept of the sequential Bayesian estimation may now be applied. The entire history of observations (through the time index k) may be written as $$Z_k \triangleq \{z_i, i=1, \ldots, k\}. \qquad (15)$$

Similarly, the sequence of parameters of the hidden Markov process is described by:

$$X_k \triangleq \{x_i, i=1, \ldots, k\}. \qquad (16)$$

Thus, $x_i$ represents the characterization of the hidden channel state including the parameters that specify the signal hypothesis $s_i$ given in equation (2). It is the objective to determine the posterior probability density function (PDF) of every possible channel characterization, wherein all channel observations are given: $p(x_k|Z_k)$ (see FIG. 4).

Once the posterior probability density function (PDF) is evaluated, one may either determine the channel configuration that maximizes the function—the so-called maximum a-posteriori (MAP) estimated value—or one may choose an expectation—equivalent to the estimated value of the minimum mean square error (MMSE). In addition, the posterior distribution itself includes the entire incertitude about the current range and is thus the optimum measure to perform a sensor data fusion in an entire position detection system.

It can be shown that the sequential estimation algorithm is recursive, since it uses the posterior probability density function (PDF) calculated for the time k−1 for the calculation of the posterior probability density function (PDF) for the time k (see FIG. 5). For a given posterior probability density function (PDF) $p(x_{k-1}|Z_{k-1})$ at the time k−1, the prior probability density function $p(x_k|Z_{k-1})$ is calculated in the so-called prediction step by applying the Chapman-Komogorov equation:

$$p(x_k|Z_{k-1}) = \int p(x_k|x_{k-1})p(x_{k-1}|Z_{k-1})dx_{k-1} \quad (17)$$

where $p(x_k|x_{k-1})$ is the state transition probability density function (PDF) of the Markov process. In the update step, the new posterior probability density function (PDF) for the step k is obtained by application of the Bayesian theorem on $p(x_k|z_k,Z_{k-1})$, the normalized product being obtained from the likelihood $p(x_k|z_k)$ and the prior probability density function (PDF):

$$p(x_k|Z_k) = p(x_k|z_k, Z_{k-1})$$
$$= \frac{p(z_k|x_k, Z_{k-1})p(x_k|Z_{k-1})}{p(z_k|Z_{k-1})}$$
$$= \frac{p(z_k|x_k)p(x_k|Z_{k-1})}{p(z_k|Z_{k-1})} \quad (18)$$

The expression $p(z_k|x_k)=p(z_k|s_{c,k})$ follows from equation (4) and represents the probability of the measured channel output signal (often referred to as the likelihood value), determined by a certain configuration of channel parameters at the same time-interval k. The denominator of equation (18) does not depend on $x_k$ and can thus be calculated by integrating the denominator of equation (18) over the entire range of $x_k$ (normalization).

Summarized this far, the entire prediction and update process may be performed recursively in order to sequentially calculate the posterior probability density function (PDF) of equation (18) on the basis of an initial value of $p(x_0|z_0)=p(x_0)$.

The evaluation of the likelihood function $p(z_k|x_k)$ is the essential part of the update step. Likewise, maximizing this likelihood function (i.e. ML estimation) is equivalent to a maximization of $p(x_k|Z_{k-1})$ only in the event that the prior probability density function $p(x_k|Z_{k-1})$ does not depend on $Z_{k-1}$ and if all values of $x_k$ a-priori have the same probability. Since these conditions are not met, the evaluation of $p(x_k|Z_k)$ entails all the previous steps.

The following will discuss the sequential estimation with the use of particle filters.

The optimum estimation algorithms are based on the evaluation of the integral of equation (17), which usually is a very difficult task, if not certain additional limitations are provided that are imposed upon the model and the noise process. Therefore, very often, a sub-optimum realization of a Bayesian estimator has to be selected for implementation.

According to the invention, the filter of choice is a sequential Monte Carlo (SMC) filter, especially a sampling importance resampling particle filter (SIR-PF) which may be considered a special case of a sequential importance sampling particle filter (SIS-PF). In this algorithm, the posterior density at the step k is represented as a sum and is specified by a set of $N_p$ particles:

$$p(x_k|Z_k) \approx \sum_{j=1}^{N_p} w_k^j \cdot \delta(x_k - x_k^j) \quad (19)$$

where each particle with the index j has a state $x_k^j$ and a weight $w_k^j$. The sum over all particle weights is one. With SIR-PF, the weights are calculated according to the principle of importance sampling, the so-called proposal density being chosen such that it is $p(x_k|x_{k-1}=x_{k-1}^j)$, and with a resampling at each time interval. For $N_p \to \infty$ the posterior approximation comes close to the true possibility density (PDF). Variants of the SIR-PF perform resampling only when necessary.

In order to make use of the advantages of a sequential estimation to benefit the present problem of multipath error reduction, the selection of a suitable movement model is of central importance in describing the dynamic behaviour of the underlying parameters. As an advantageous implementation for the method proposed, the parameters are described by the following approximations:

For each signal received, the delay of the direct signal $\tau_{1,j,k}$ at the receiver is given by the position parameters $p_k^{r,x}$, $p_k^{r,y}$, $p_k^{r,z}$ and the clock error $\tau_k^r$, since $$c^{-1}\sqrt{(p_k^{r,x} - p_{j,k}^{t,x})^2 + (p_k^{r,y} - p_{j,k}^{t,y})^2 + (p_k^{r,z} - p_{j,k}^{t,z})^2} + \tau_k^r - \varepsilon_{j,k} = \tau_{1,j,k}$$

and both the source positions and the correction terms are supposed to be known.

The position parameters follow the stochastic process below:

$$p_k^{r,x} = p_{k-1}^{r,x} + \dot{p}_{k-1}^{r,x} \cdot \Delta t + n_x$$

$$p_k^{r,y} = p_{k-1}^{r,y} + \dot{p}_{k-1}^{r,y} \cdot \Delta t + n_y$$

$$p_k^{r,z} = p_{k-1}^{r,z} + \dot{p}_{k-1}^{r,z} \cdot \Delta t + n_z$$

The parameters $\dot{p}_k^{r,x}$, $\dot{p}_k^{r,y}$, $\dot{p}_k^{r,z}$ describe the speed of the position parameters and follow a process of their own:

$$\dot{p}_k^{r,x} = \dot{p}_{k-1}^{r,x} + n_{\dot{x}}$$

$$\dot{p}_k^{r,y} = \dot{p}_{k-1}^{r,y} + n_{\dot{y}}$$

$$\dot{p}_k^{r,z} = \dot{p}_{k-1}^{r,z} + n_{\dot{z}}$$

The clock error follows the stochastic process:

$$\tau_k^r = \tau_{k-1}^r + \dot{\tau}_{k-1}^r \cdot \Delta t + n_{\tau,r}$$

The parameter $\dot{\tau}_k^r$ describes the drift of the receiver clock and follows a process of its own:

$$\dot{\tau}_k^r = \dot{\tau}_{k-1}^r + n_{\dot{\tau},r}$$

The multipath channel is completely characterized by a direct path and up to $N_m - 1$ echo signals.

At the time k, each path described by the index i has a complex amplitude $\alpha_{i,j,k}$ and a delay $\tau_{i,j,k}$, where the relative delays of the echo signals can only assume positive values.

The various path delays follow the stochastic process:

$$\tau_{i,j,k} = \tau_{i,j,k-1} + \dot{\tau}_{i,j,k-1} \cdot \Delta t + n_\tau, i > 1$$

The parameters $\dot{\tau}_{i,k}$ describe the speed of the path delays of the multipaths and follow their own process:

$$\dot{\tau}_{i,j,k} = \dot{\tau}_{i,j,k-1} + n_{\dot{\tau}}, i > 1$$

The value and the phase of the individual paths, described by the complex amplitudes $\alpha_{i,j,k}$, are eliminated by maximizing the likelihood function for given values $\tau_{i,j,k}$ with respect to $\alpha_{i,j,k}$. This serves to reduce the parameter space, aiming at a reduction of the complexity.

Every path may either be "on" or "off", specified by the parameter $$e_{i,j,k} \in \{0,1\}.$$

The values $e_{i,j,k}$ follow a simple Markov process with two states and asymmetric transition probabilities.

The stochastic model includes two Gaussian noise sources $n_x, n_y, n_z, n_{\dot{x}}, n_{\dot{y}}, n_{\dot{z}}, n_{\tau,\tau}, n_{\dot{\tau},\tau}, n_e$, n as well as the noise process for controlling the state transitions for the values $e_{i,j,k}$. The parameter $\Delta t$ refers to the time span between the times $k-1$ and $k$.

Thus, the method according to the present invention is characterized by an implementation of the estimator as a recursive Bayesian filter for a combined position determination and multipath suppression.

The binding of the delay of the direct paths is taken into consideration via the position and clock parameters.

The selection of the movement model—proposed by the present invention—with the speeds of change and the variable life cycle of the paths is a particular feature of the method of the present invention.

The number of paths is implicitly co-estimated in the method proposed by the present invention (at the time k, it results from the sum of the values $e_{i,k}$).

The position space likelihood function is suitable calculated following M. Angermann, J. Kammann, P. Robertson, A. Steingass and T. Strang: "Software representation for heterogeneous location data sources using probability density functions", International Symposium on Location Based Services for Cellular Users, LOCELLUS 2001, Munich, Germany, February 2001, pages 107-118, as a product of the likelihood values of the individual soft-output DLLs, cf.: B. Krach and M. Lentmaier: "Efficient soft-output GNSS signal parameter estimation using signal compression techniques", in Proceedings of the $3^{rd}$ ESA Workshop on Satellite Navigation User Equipment Technologies, Navitec 2006, Noordwijk, The Netherlands, December 2006.

As a result, the method of the present invention yields a-posteriori probability density functions (PDFs) of the estimated parameters, i.e. not only a fixed estimated value. Ambiguities are also included in the solution. This may be advantageous in the further processing within other modules of the receiver, e.g. for soft location.

Figure 6:
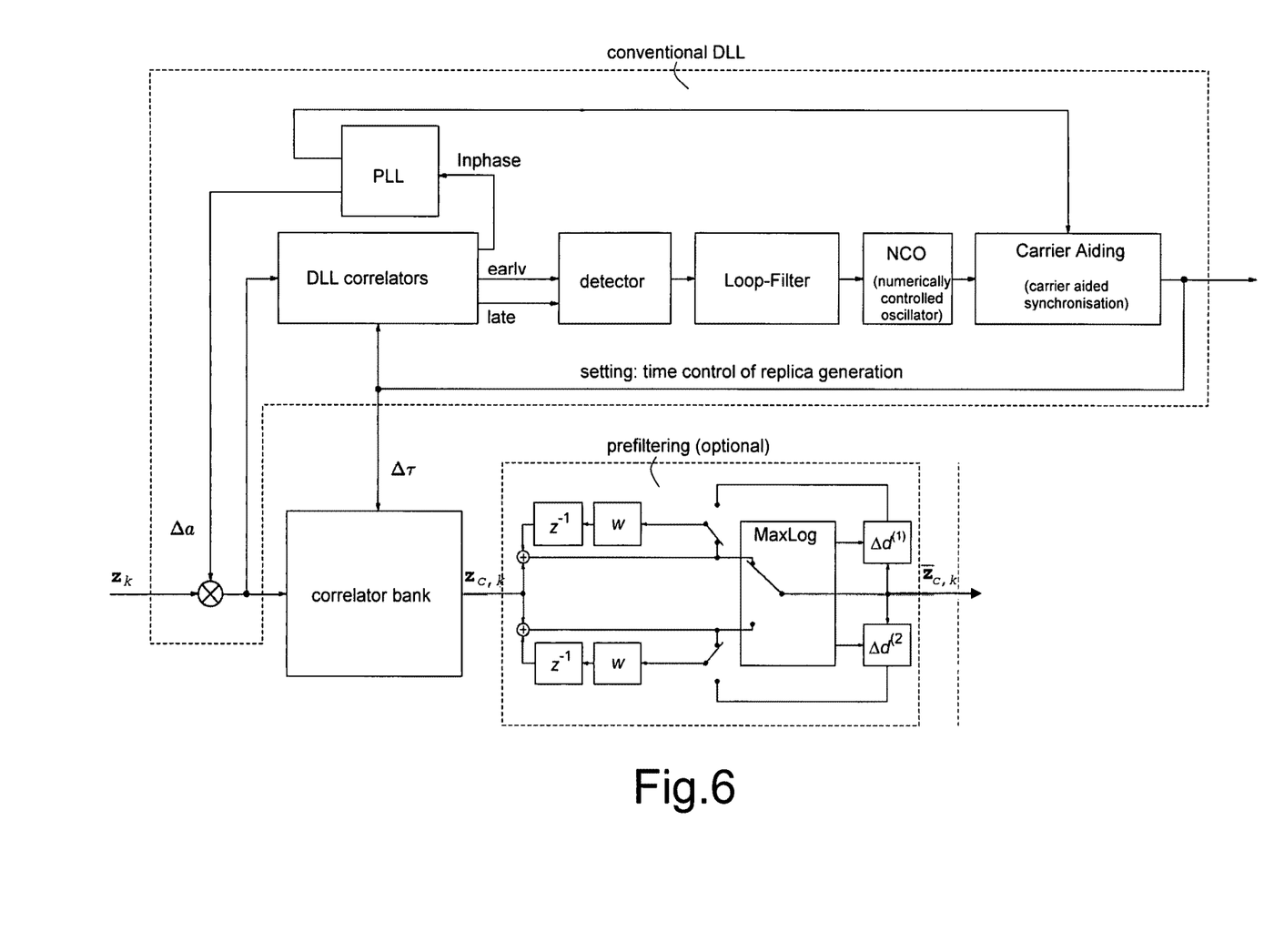
FIG. 6 is a block diagram of the structure of a conventional GNSS navigation receiver with a soft-output DLL.
Figure 7:
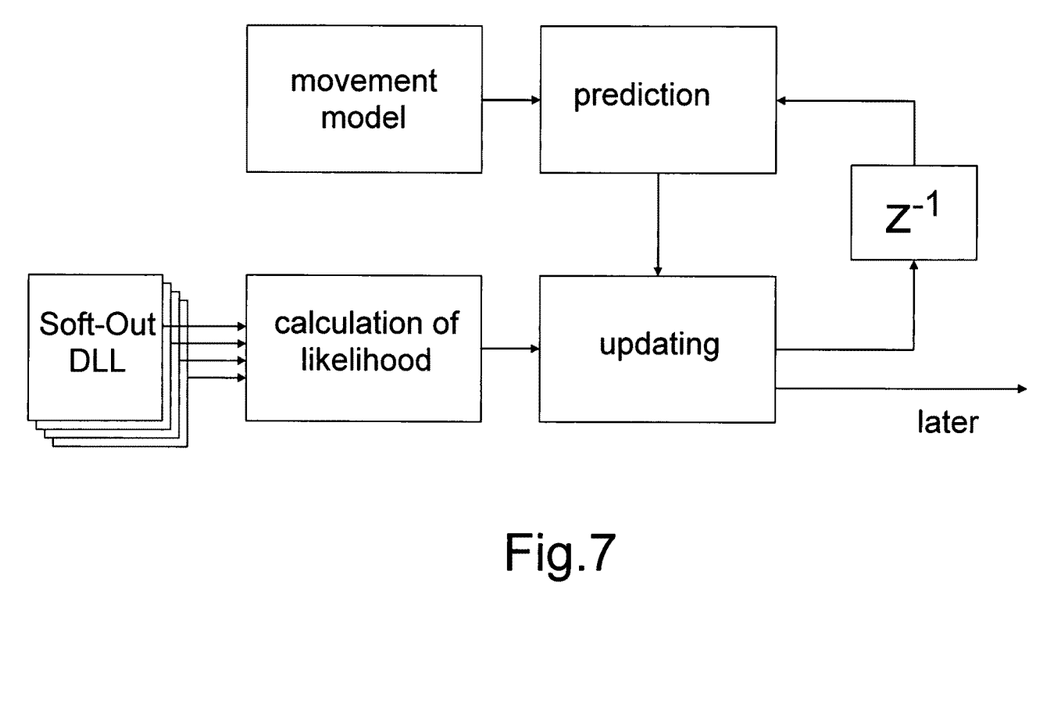
FIG. 7 is a further block diagram illustrating a recursive Bayesian estimation device adapted for integration at the output side of the navigation receiver illustrated in FIG. 6, for a combined position determination and multipath estimation.

The embodiment outlined in FIG. 6 and FIG. 7 as a block diagram illustrates an example of how the sequential estimator (FIG. 7) could be integrated into a conventional navigation receiver (FIG. 6). This capitalizes on the architecture described in the above mentioned article by B. Krach, M. Lentmaier: "Efficient Soft-Output GNSS Signal Parameter Estimation using Signal Compression Techniques" in Proceedings of the 3rd ESA Workshop on Satellite Navigation User Equipment Technologies, Navitec 2006, Noordwijk, The Netherlands, December 2006, wherein a conventional DLL/PLL loop supports a bank of correlators whose output signals are filtered in an appropriate manner.

These filtered output signals then serve as measured values from which the likelihood values are calculated in a recursive Bayesian filter. For an efficient calculation, the known methods may be used that are proposed in the above mentioned article by J. Selva Vera: "Complexity Reduction in the Parametric Estimation of Superimposed Signal Replicas" in Signal Processing, Elsevier Science, Vol. 84, No. 12, pages 2325-2343, 2004. The optional pre-filtering allows to increase the time interval $\Delta t$ and to thus reduce the complexity of the Bayesian filter.

Principally, it is to be noted that the computational complexity of the Bayesian filter algorithm is critical for the integration of the inventive method into a receiver. From a theoretical point of view, it is desirable to operate the sequential Bayesian filter such that it is timed according to the coherent integration period of the receiver, and to work with a large number of particles.

From a practical point of view, however, it is desirable to reduce the sequential filter rate to the navigation rate and to minimize the number of particles. Existing ML solutions may be helpful in reaching a flexible tradeoff between complexity and performance, since one may directly use strategies already developed for the expansion of the observation periods of ML estimators to reduce the rate of the algorithm for a sequential Bayesian filtering.

Figure 8:
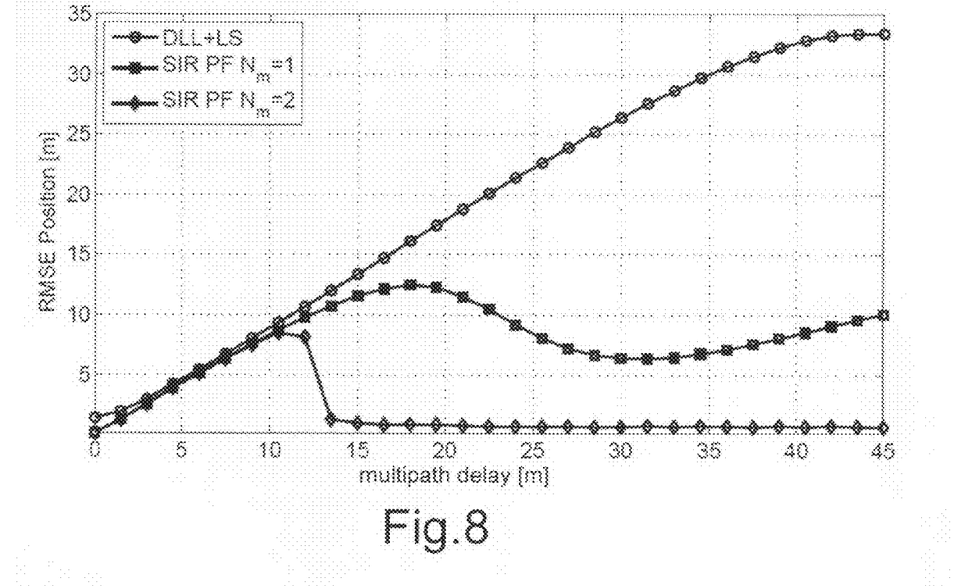
FIG. 8 is a diagram of simulation results (residual position errors) regarding the static channel of the method according to the invention as compared with conventional DLL.
Figure 9:
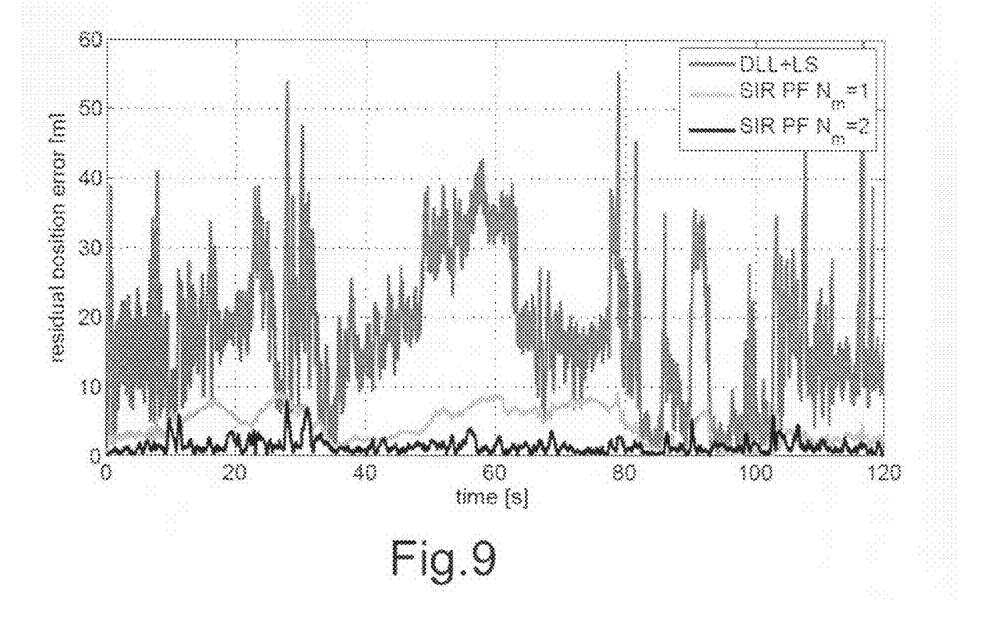
FIG. 9 is another diagram showing the simulation results (residual position errors) regarding the dynamic channel of the method according to the invention as compared with conventional DLL.

FIG. 8 (static channel) and FIG. 9 (dynamic channel) are diagrams illustrating results of computer simulations comparing the performance of the SIS ("Sequential Importance Sampling")-based sequential estimator (SIR PF $N_m$=1 and SIR PF $N_m$=2) with the performance conventional equation solution on a DLL basis with a "narrow correlator" (DLL+LS). The comparison of the residual position errors (RMSE position=residual mean square error position) shows that the method proposed by the invention allows for substantial improvements.

Although the invention has been described and illustrated with reference to specific embodiments thereof, it is not intended that the invention be limited to those illustrative embodiments. Those skilled in that art will recognize that variations and modifications can be made without departing from the true scope of the invention as defined by the claims that follow. It is therefore intended to include within the invention all such variations and modifications as fall within the scope of the appended claims and equivalents thereof.

What is claimed is:

1. A method for estimating hidden channel parameters, specifically delay, amplitude and phase, of a GNSS navigation signal received in a dynamic multipath environment, comprising:

using a sequential estimation by means of a recursive Bayesian filtering which starts from a likelihood value of a measured channel output signal and updating said value using a state transition model, utilizing knowledge about statistic dependences of sets of time-varying channel parameters by introducing a movement model related to an actual channel environment, said movement model corresponding to a Markov process and forming a state transition model, utilizing knowledge that reflection signals typically have a life cycle starting from a first appearance and experiencing a change in delay, amplitude and phase over time until the reflection signals disappear, to form a prediction, and, estimating with said movement model as a basis, channel parameters sequentially by means of a recursive Bayesian filter, a number of paths being implicitly included in said step of estimating, wherein a result of said step of estimating is not only a fixed estimated value, but probability density functions of the estimated channel parameters, and using the estimated channel parameters for signal processing of a received GNSS signal in the dynamic multipath environment;

wherein said movement model takes binding of a delay of a direct signal path into account via position parameters and clock parameters determined on a receiver side, wherein dynamic behavior of the dynamic channel parameters is approximated by a stochastic movement model having the following design:

for each signal received, a delay of a direct signal $\tau_{1,j,k}$ at a receiver is given by position parameters $p_k^{r,x}$, $p_k^{r,y}$, $p_k^{r,z}$ and clock error $\tau_k^r$, since $$c^{-1}\sqrt{(p_k^{r,x}-p_{j,k}^{t,x})^2+(p_k^{r,y}-p_{j,k}^{t,y})^2+(p_k^{r,z}-p_{j,k}^{t,z})^2}+\tau_k^r-\varepsilon_{j,k}=\tau_{1,j,k}$$

and both source positions and correction terms are known;

wherein the position parameters follow the following stochastic process:

$$p_k^{r,x}=p_{k-1}^{r,x}+\dot{p}_{k-1}^{r,x}\cdot\Delta t+n_x$$

$$p_k^{r,y}=p_{k-1}^{r,y}+\dot{p}_{k-1}^{r,y}\cdot\Delta t+n_y$$

$$p_k^{r,z}=p_{k-1}^{r,z}+\dot{p}_{k-1}^{r,z}\cdot\Delta t+n_z$$

wherein parameters $\dot{p}_k^{r,x}$, $\dot{p}_k^{r,y}$, $\dot{p}_k^{r,z}$ describe a speed of the position parameters and follow the following process:

$$\dot{p}_k^{r,x}=\dot{p}_{k-1}^{r,x}+n_{\dot{x}}$$

$$\dot{p}_k^{r,y}=\dot{p}_{k-1}^{r,y}+n_{\dot{y}}$$

$$\dot{p}_k^{r,z}=\dot{p}_{k-1}^{r,z}+n_{\dot{z}}$$

wherein the clock error follows the following stochastic process:

$$\tau_k^r=\tau_{k-1}^r+\dot{\tau}_k^r\cdot\Delta t+n_{\tau,r}$$

wherein parameter $\dot{\tau}_k^r$ describes a drift of a receiver clock and follows the following process:

$$\dot{\tau}_k^r=\dot{\tau}_{k-1}^r+n_{\dot{\tau},r}$$

wherein a multipath channel is characterized by a direct path and up to $N_m-1$ echo signals;

wherein at a time k, each path described by index i has a complex amplitude $a_{i,j,k}$ and a relative delay $\Delta\tau_{i,j,k}=\tau_{i,k}-\tau_{i,j,k}$, where the relative delays of echo signals can only assume positive values;

wherein various relative path delays follow the following stochastic process:

$$\tau_{i,j,k}=\tau_{i,j,k-1}+\dot{\tau}_{i,j,k-1}\cdot\Delta t+n_v, i>1$$

wherein parameters $\dot{\tau}_{i,j,k}$ describe a speed of the path delays of multipaths and follow the following process:

$$\dot{\tau}_{i,j,k}=\dot{\tau}_{i,j,k-1}+n, i>1$$

wherein a value and phase of individual paths, described by complex amplitudes $\alpha_{i,j,k}$, are eliminated by maximizing a likelihood function for given values $\tau_{i,j,k}$ with respect to $\alpha_{i,j,k}$, which serves to reduce parameter space, aiming at a reduction of complexity;

wherein every path may be specified by the parameter $$e_{i,j,k}\in\{0=\text{"off"}, 1=\text{"on"}\}$$

wherein values $e_{i,j,k}$ follow a simple Markov process with two states and asymmetric transition probabilities; and wherein the stochastic movement model includes two Gaussian noise sources $n_x$, $n_y$, $n_z$, $n_{\dot{x}}$, $n_{\dot{y}}$, $n_{\dot{z}}$, $n_{\tau,r}$, $n_{\dot{\tau},r}$, $n_\tau$, n as well as a noise process for controlling state transitions for the values $e_{i,j,k}$ and wherein parameter $\Delta\tau$ refers to a time span between times k−1 and k.

2. The method of claim 1, wherein the recursive Bayesian filtering uses a sequential importance sampling method (SIS).

* * * * *